Aug. 14, 1956
H. W. KLINE
2,759,095
CHRISTMAS TREE LIGHTING HARNESS
Filed May 11, 1954
2 Sheets-Sheet 2
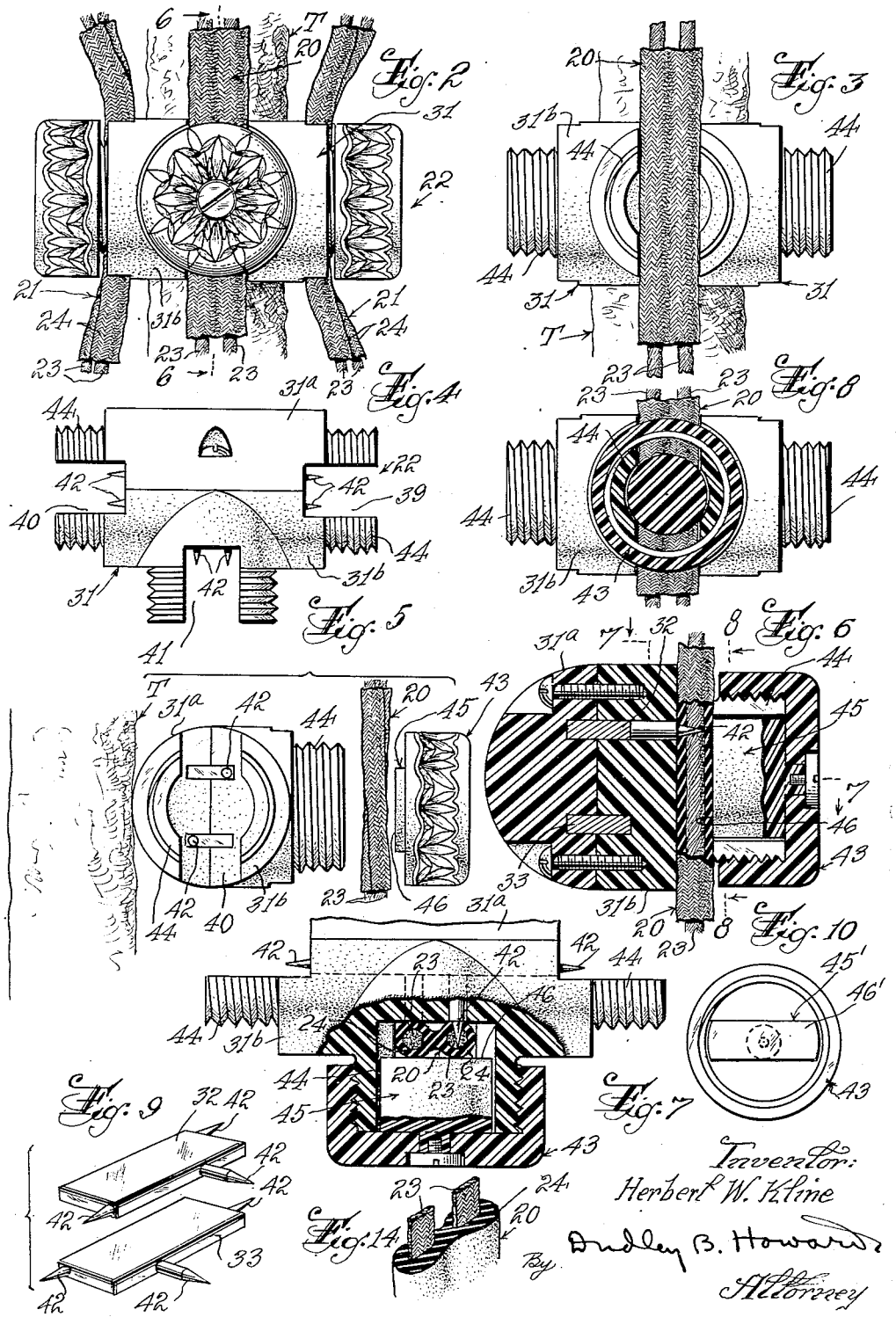

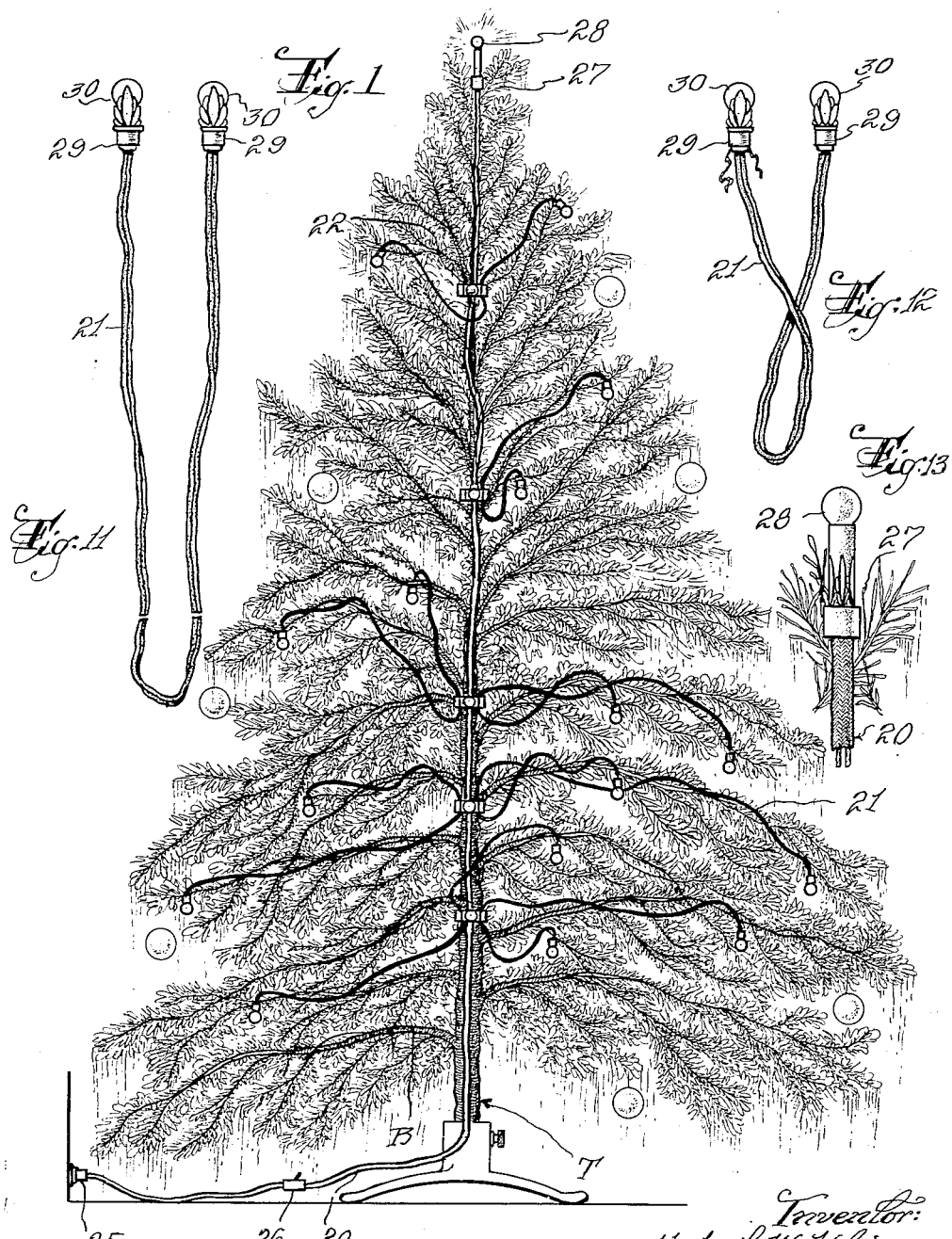

United States Patent Office 2,759,095
Patented Aug. 14, 1956

2,759,095

CHRISTMAS TREE LIGHTING HARNESS

Herbert W. Kline, Summit, N. J.

Application May 11, 1954, Serial No. 428,976

4 Claims. (Cl. 240—10)

The invention relates to electric lighting harness for Christmas trees.

Prior to my present invention, each conventional package unit of tree lighting harness has been in the form of a completely prefabricated cord, bulb-socket, attachment-plug combination wherein a pair of flexible insulated conductors have a receptacle-attachment plug connected to the cut ends thereof and plural bulb sockets distributed at fixed intervals along the loop and connected electrically to the conductors usually in parallel so that failure of a single bulb will not cause the others to become extinguished. Harness of this type cannot be installed in a tree with the bulb-bearing cord extending entirely lengthwise of the trunk and branches in a neat manner. On the contrary, it is necessary to drape the cord in an unsightly manner from one branch to another as it is arranged spiralwise around the tree. Moreover, it is necessary to make the harness available in comparatively short units and to combine two or more units in the installation for a single tree. The installation task with this prior art lighting harness is difficult and tedious and often results in undesirably located light bulbs despite the most careful planning, due partly to the variations in tree form.

The primary object of my present invention is to provide a radically new tree lighting harness which is free from the above enumerated disadvantages of the conventional harness. In accordance with the invention, my improved harness is completely structure-conformable when assembled by the user. A single feeder cord is included to be laid vertically along the tree trunk neatly and inconspicuously and the required number of branch cords which are included may be laid along the tree branches in like manner and connected electrically to the feeder cord by pin-type tap connectors of novel construction which are also included in the harness unit for location in suitable proximity to the respective crotches between tree trunk and branches, whereby there will be no interbranch draping or stringing of electrical cords. The interdependent combination of cords and connector elements in a single package unit or kit serves to adapt the harness to installation in trees of varying sizes and irregular branch locations such as are usually encountered when making a selection.

An important object of the invention is the provision of a connector element to interconnect the feeder and branch cords electrically which is of such construction that said interconnection may be effected at irregularly located points along any cord that may best conform to the tree structure without having to sever the cord or to strip the insulation therefrom. Due to this specific connector structure, it is practicable to use feeder and branch cords that do not have exposed conductor ends. Each branch cord may have permanently attached light bulb sockets at both ends to permit a variety of bulb location arrangements in relation to the tree branch upon which it is laid during installation of the harness as a whole.

Other objects, advantages and features of the invention will become apparent as the following specific description is read in connection with the accompanying drawings, in which:

Fig. 1 is a general elevational view of a Christmas tree having the improved lighting harness installed therein.

Fig. 2 is a front elevation of one of the multiple tap connectors in use; and Fig. 3 is a view similar to Fig. 2 showing the branch cords and all retaining caps removed.

Fig. 4 is a top plan view of the multiple tap connector with all cords and retaining caps removed; and Fig. 5 is an end view showing a feeder cord about to be inserted in the seating groove therefor.

Fig. 6 is an enlarged section of the multiple tap connector on line 6—6 of Fig. 2; and Fig. 7 is a similar sectional view on line 7—7 of Fig. 6.

Fig. 8 is a section on line 8—8 of Fig. 6.

Fig. 9 is a perspective view of the two bus bars which form elements of the multiple tap connector.

Fig. 10 is an inner face view of one of the retainer caps, showing a modified form of presser member.

Figs. 11 and 12 are detail views of two varieties of branch cord.

Fig. 13 is a detail view of the upper end of the feeder cord; and Fig. 14 is a fragmentary sectional view of a modified form of feeder cord.

Referring now in detail to the drawings, in which like reference characters designate corresponding parts in the several views, Fig. 1 represents a Christmas tree having the improved lighting harness installed in neatly "tailored" lengthwise conformity to its trunk and branch structure. It should be apparent from this general illustration that the harness comprises three principal elements, viz.: a single trunkwise feeder cord 20, plural branchwise branch cords 21, and plural tap connectors 22 to interconnect the feeder cord and respective branch cords electrically at the respective crotches or forks between tree trunk T and the several branches B.

Each tap connector 22, which will be described in complete structural detail later herein, exclusively employs pin-type contacts for conductor piercing connection with the respective cords 20 and 21 in order that connections may be made at selected points anywhere along either of said cords without cutting the latter or stripping the insulation covering therefrom. Consequently, it is necessary to use flat cord having a pair of stranded electrical conductors 23—23 arranged side by side in parallelism within insulation covering 24 (Fig. 7).

Selective determination of the longitudinal dimensions of the feeder cord 20 and the several branch cords 21, respectively, for a standard package harness unit is greatly simplified because of the structure-conformable nature of the invention. For instance, feeder cord 20 may be dimensioned to extend from the ceiling to the floor of a room of average height plus sufficient additional length to reach from the trunk base of a tree of maximum girth to a closely adjoining wall outlet receptacle. The branch cords 21 may be made in two standard lengths (Figs. 11 and 12). A majority of them may be substantially equal to the maximum anticipated branchtip diameter of a tree of large girth for application to the lower and middle branches of the tree, whereas a few of these cords may be made shorter for accommodation to the branches at the tapered top of the tree. However, with branch cords of uniform length, it is quite practicable with the exercise of some ingenuity to obtain any desired distribution of light bulbs along the branches anywhere in the tree. The number of branch cords and tap connectors to be included in a package unit may be estimated readily after a study of the variation in number of branches and the lengths thereof in trees customarily used for indoor display.

The lower end of feeder cord 20 should have a pronged plug 25 of standard design for attachment to a wall outlet receptacle. In order to permit continuous attachment of plug 25 to the wall outlet receptacle, a switch 26 of any desired type usually will be provided in connection with feeder cord 20 suitably adjacent to said plug. The upper end of feeder cord 20 may have means to prevent exposure of the electrical conductors thereof such as light bulb socket 27, which may have fitted therein a bulb 28 of the kind shown in Fig. 1 or some decorative device appropriate to Christmas, such as an illuminated star (not shown).

Each branch cord 21 preferably has the novel disposition of light bulb sockets 29—29 at the opposite ends thereof shown in the drawings. In this way, the conductor ends are protected against exposure and it is practicable to choose the point of electrical connection of said branch cord to tap connector 22 that will permit location of the two light bulb sockets 29—29 and their bulbs 30—30 at decoratively appropriate points along a tree branch of any length within the normal range. Several practicable arrangements are illustrated in Fig. 1.

Referring now to Figs. 2 to 10 of the drawings, it will be observed that each of the novel multiple tap connectors 22 that are included as essential elements of my improved tree lighting harness has a body 31 to support, insulate and house a pair of bus bars 32 and 33, which latter may be made of brass or any other acceptable conductor of electricity. Connector body 31 preferably is entirely composed of "bakelite" or other suitable insulating material.

In form, connector body 31 may be angular in general shape and for the purpose of illustration is T-shaped, as shown, and geometrically composed of a long portion preferably in the form of a cylinder and a short portion preferably in the form of a cylinder which merge in such a manner that the latter is perpendicular to the former medially thereof. At the opposite ends of the long cylindrical portion of connector body 31, transverse grooves, or slots, 39 and 40 are provided to serve as seating means for two of the electric cords of the tree lighting harness. Although some other relative arrangement may be adopted within the scope of the invention, it is preferred to have cord seating grooves 39 and 40 extend substantially in a common plane including the axis of the long cylindrical portion and perpendicular to the axis of the short cylindrical portion. The latter cylindrical portion is provided in its outer end with a similar cord seating groove 41 lying in a plane including the axis of said portion and extending transversely with respect to the axis of the long cylindrical portion. Each cord seating groove preferably has a flat outwardly presented inner seating face for even abutment against one flat side of a cord laid in said groove and has perpendicular side walls spaced substantially as far apart as the width of a standard cord but no less.

The two bus bars 32 and 33, shown unassembled in Fig. 9, are embedded in connector body 31 in insulated relation to each other and to the external surfaces of said body. While it may be practicable to embed the bus bars, as "inserts," in the process of molding connector body 31, it is convenient to divide said body into two sections 31a and 31b on a plane including the axis of the long cylindrical portion and perpendicular to the axis of the short cylindrical portion, and thereafter to set the bus bars in registering recesses provided in the meeting faces of body sections 31a and 31b. The form and disposition of the body recesses are such that one of the three pin-type contacts 42—42—42 of one bus bar will project into each of the three cord seating grooves 39—40—41 through the seating face thereof in perpendicular relation to said face and at one side of the longitudinal center line thereof, whereas one of the contacts of the other bus bar will project similarly into each cord seating groove at the opposite side of the longitudinal center line. In this manner, there will be two contacts in each cord seating groove in proper positions to register with and penetrate the respective stranded conductors of the cord.

The extent of groove penetration by each contact point should be such that there can never be greater penetration of any cord conductor than just to the opposite side thereof from the seating face of the groove and thus short of penetration of the insulation covering of the conductor at the opposite, outer side of the latter. This provision is intended to insure against any extrusion and exposure of conductor strands on the outside of the insulation covering such as might cause dangerous short-circuiting.

The T-shaped formation of connector body 31 being merely one arrangement of the angular portions thereof (triple connection), which has been suggested by way of example, other numbers of angular portions and their relative arrangements being within the scope of the invention, it may be appropriate to describe the novel arrangement of the two bus bars in relation to at least two cord seating grooves of a multiple connector in an alternative manner of expression. For instance, predicating the arrangement of the cord seating grooves upon the construction of the bus bars and their location within the connector body, instead of the reverse, it may be stated that one of the grooves is arranged to extend transversely with respect to the side edges of the bus bars and perpendicular to the planes thereof, whereas another groove extends transversely with respect to the end edges of the bus bars and perpendicular to the planes thereof. This definition applies generically to a straight connector body with two cord seating grooves, to the T-shaped illustrative example shown in the accompanying drawings, and to any of the variously arranged angularly portions of other types of connector body in common use, which have not been shown.

Each grooved end portion of connector body 31 is provided with a retainer cap 43 to serve the dual purposes of forcing the electric cord laid in each seating groove into conductor piercing contact with the pair of bus bar contacts located therein and of retaining the cord in securely seated and clamped position with its two stranded conductors in electrical connection with the respective bus bars and therethrough with any electric cord that may be engaged with other contacts of said bus bars located in one of the other seating grooves. The retainer caps 43—43—43 may be removably attached to connector body 31 in operative positions by any suitable means, such as spring detent means (not shown), but I prefer to employ the precision-adjustment screw-threaded means disclosed in the accompanying drawings.

In this preferred embodiment, connector body 31 is provided astride of each cord seating groove with a split sleeve 44 that is screw threaded for application of a retainer cap 43. Limiting shoulders are provided on cap 43 and on connector body 31 at the rim of sleeve 44. Presser means 45 is provided inside each retainer cap 43 and has an inwardly presented contact face 46 disposed at right angles to the rotational axis of said cap for contact with the outer flat side of an electric cord that has been laid in the corresponding seating groove of connector body 31. The location of the limiting shoulders on cap 43 and the rim of body sleeve 44 in relation to contact face 46 of presser means 45 should be such that a standard electric cord of predetermined thickness will be pressed against the corresponding bus bar contact points with just the precise degree of axial movement to effect penetration of the stranded conductors of the cord to the desired safe depth.

Presser means 45, as shown in Figs. 5 to 8, is a cylindrical block-like member of insulating material arranged concentric to the rotational axis of retainer cap 43 within split sleeve 44 of connector body 31. While presser member 45 may be formed integral with cap 43, a novel feature of the present invention is to mount said member in a swivel bearing in the head of cap 43. By mounting presser member 45 in this manner, it will become immobilized against rotation with retainer cap 43 upon gaining contact with the seated electric cord during inward adjustment of the cap and consequently cannot produce undesirable twisting or abrasion of the cord as the cap continues to the inward limit of its movement. Moreover, this feature permits use of interchangeable presser members of different axial dimension so that they may be selectively inserted in any retainer cap to accommodate electric cords of different thicknesses. In this way, the desired degree of conductor penetration by the contact points may be assured although the length of the latter remains unchanged.

A further feature is to have the free inner end of presser member 45 with its contact face 46 protrude beyond the rim of cap 43 to such an extent that the said cap rim cannot objectionably indent the insulation covering of an electric cord when the cap has been screwed on tight.

While it is desirable to avoid damaging indentation of cord insulation by the radially narrow retainer cap rim, there should be provision for effective clamping of the cord in order to relieve the contact pins of lateral strain, which otherwise might result from lengthwise pull on the cord. The contact face 46 of the cylindrical embodiment of presser member 45 illustrated in Figs. 5 to 8 will offer substantial cord clamping action, but it may be preferable to substitute the bar-type presser member 45' shown in Fig. 10. This modified form of presser member is centrally swiveled in the top of retainer cap 43 just like the cylindrical form of presser member and should be of such width and length that its ends will project into the cord seating slot extensions in split sleeve 44 of connector body 31 for guided sliding movement toward and away from a seated electric cord. Due to this modified presser member structure, a greater length of cord will be subjected to clamping action than with the cylindrical presser member and there will be the added advantage that the presser member will be secured positively against rotation about the cap axis at all times. Consequently, there can be no "scrubbing" contact with the cord, such as will occur momentarily as the cylindrical type of presser member (Figs. 5 to 8) closes on the cord upon commencement of inward adjustment of the retainer cap.

Referring now to Fig. 9, it will be observed that the two bus bars 32 and 33 are identical in structure. However, for assembly with the body 31 of each tap connector 22, they are reversed end for end as shown in Fig. 9 to bring the cooperative contact pins 42 of each pair into proper positions to straddle the center line of the seating groove into which they project. The economic advantage of this feature is that bus bars for all connectors may be produced by a single mold or die, depending upon the particular quantity production process employed.

In Fig. 1, no means is shown for attaching the feeder and branch cords to the trunk and branches of the tree, but it is within the scope of the invention to use suitable means for that purpose, such as spring clips, wire, or the tie-strings shown at one end of branch cord 21 in Fig. 12. The branch cords are shown in this view as being roughly arranged to locate the terminal light bulbs in tentative positions. It is to be understood that, after the most desirable locations have been determined, suitable attaching means may be used to attain the neat lengthwise tree branch conformation which is the object of the invention.

It will be understood that it is intended to cover all changes and modifications of the examples of the invention herein chosen for the purpose of illustration which do not constitute departures from the spirit and scope of the invention.

Having thus described the invention, I claim:

1. An electric lighting harness for Christmas trees comprising: a flat feeder cord having a pair of continuously side by side stranded conductors for lengthwise application to the tree trunk and including means for connection to a source of supply of electric current; plural continuously insulated branch cords of the same type as the feeder cord for lengthwise application to the tree branches with the medial portions of said branch cords in close proximity to the feeder cord; light bulb sockets connected to opposite ends of each branch cord; and plural multiple tap connectors of pin-point contact type freely adjustable in position along the feeder cord for tree crotch location and in relation to any branch cord to interconnect the feeder and branch cords electrically at appropriate points between the ends thereof, each tap connector including a body of insulating material having plural relatively spaced peripheral seating grooves for the respective feeder and branch cords, a pair of conducting bus bars embedded in said body in insulated relation to each other and to the body periphery, contact pins having conductor-piercing points projecting outwardly from each bus bar into the respective cord seating grooves, the contact pins of both bus bars which enter each cord seating groove being disposed at opposite sides of the longitudinal center line of said groove, and a retainer cap of insulating material separably engaged with the connector body in covering relation to each cord seating groove and being adjustable axially with respect to the contact pins thereof, each retainer cap including inwardly presented presser means facing the points of the contact pins to press the electric cord laid in the corresponding seating groove into conductor piercing contact with said contact pins.

2. A multiple tap connector comprising: a body of insulating material; a pair of bus bars of elongated flat construction embedded in said body in insulated relation to each other and to the body periphery and being arranged with the planes thereof and longitudinal axes in parallelism; said body being provided with at least two peripheral cord seating grooves arranged with one of said grooves extending transversely with respect to the side edges of the bus bars and perpendicular to the planes thereof and with another of said grooves extending transversely with respect to the end edges of the bus bars and perpendicular to the planes thereof; an integral contact pin with a conductor-piercing point projecting outward from the correspondingly located edge of each bus bar in the plane thereof into each respective cord seating groove, the arrangement of the contact pins on the bus bars being such that the pair of said pins on the respective bus bars for each cord seating groove are located at opposite sides of the center line of said groove for registration with the respective conductors of a cord seated therein; and adjustable cap means to cover each groove and adapted to press the seated cord into contact with the corresponding contact pins.

3. A multiple tap connector as defined in claim 2, wherein the bus bars of each connector are identical in construction and in the relative arrangement of their contact pins, whereby endwise reversal of matching bus bars will bring the contact pins of both into proper positions for registration of the respective pairs thereof with the corresponding cord seating grooves.

4. A multiple tap connector as defined in claim 2, wherein the connector is divided in a plane coincident with the longitudinal axes of the bus bars and perpendicular to the planes thereof into two separable sections; wherein the respective body sections are provided with opposed recesses parallel to the bus bars and registering with the outer longitudinal side edges thereof to countersink the longitudinal halves thereof in said recesses; and wherein means is provided to detachably secure the separable body sections in assembled relation.

References Cited in the file of this patent

UNITED STATES PATENTS

| | | |
|---|---|---|
| 1,315,317 | Letiecq | Sept. 9, 1919 |
| 1,637,046 | Montsinger | July 26, 1927 |
| 2,576,165 | Wood | Nov. 27, 1951 |

FOREIGN PATENTS

| | | |
|---|---|---|
| 691,802 | Great Britain | May 20, 1953 |